United States Patent [19]
Doyle et al.

[11] Patent Number: 6,165,643
[45] Date of Patent: Dec. 26, 2000

[54] HYDROGEN STORAGE MATERIALS

[75] Inventors: Mark Laurence Doyle, Royston; Ivor Rex Harris, Birmingham; Allin Sidney Pratt, Wallingford; David Benjamin Willey, Henley on Thames, all of United Kingdom

[73] Assignee: Johnson Matthey Public Limited Company, London, United Kingdom

[21] Appl. No.: 09/423,074

[22] PCT Filed: Apr. 30, 1998

[86] PCT No.: PCT/GB98/01272

§ 371 Date: Jan. 4, 2000

§ 102(e) Date: Jan. 4, 2000

[87] PCT Pub. No.: WO98/50968

PCT Pub. Date: Nov. 12, 1998

[30] Foreign Application Priority Data

May 1, 1997 [GB] United Kingdom ............... 9708873

[51] Int. Cl.[7] .................................................. H01M 4/58
[52] U.S. Cl. ................... 429/218.2; 429/59; 429/218.1
[58] Field of Search ................... 429/59, 218.1, 429/218.2

[56] References Cited

U.S. PATENT DOCUMENTS

| 4,188,464 | 2/1980 | Adams et al. ............... 429/210 |
| 4,859,413 | 8/1989 | Harris et al. . | |
| 4,902,579 | 2/1990 | Grasselli et al. ............... 428/610 |
| 5,128,219 | 7/1992 | Kohler et al. . | |
| 5,393,616 | 2/1995 | Mori et al. . | |
| 5,451,474 | 9/1995 | Wu et al. . | |
| 5,455,125 | 10/1995 | Matsumoto et al. ............... 429/59 |
| 5,628,887 | 5/1997 | Patterson et al. ............... 204/241 |

FOREIGN PATENT DOCUMENTS

| 0 198 599 | 10/1986 | European Pat. Off. . |
| 0 251 384 | 1/1988 | European Pat. Off. . |
| 0 591 606 | 4/1994 | European Pat. Off. . |
| 0 671 357 | 9/1995 | European Pat. Off. . |
| WO 96/23906 | 8/1996 | WIPO . |

OTHER PUBLICATIONS

Z. Yunshi et al.; Letter: "Accumulation of rare–earth metal on the surface of the microencapsulated hydrogen storage alloy," Journal of Alloys and Compounds, 190, 1993, L37–L38.

J. Chen et al., "Nickel/metal hydride batteries using rare–earth hydrogen storage alloy," Journal of Material Research, vol. 9, No. 7, Jul. 1994, pp. 1802–1804.

A. Zuttel et al., "Effects of electrode compacting additives on the cycle life and high–rate dischargeability of $Zr(V_{0.25}Ni_{0.75})_2$ metal hydride electrodes in alkaline solution," J. Alloy and Compounds, 206, 1994, pp. 31–38.

M. Geng; Electrochemical characterization of $MmNi_5$–based alloy powder coated with palladium and nickel–palladium, Journal of Alloys and Compounds, 215, 1994, pp: 151–153.

*Primary Examiner*—Patrick Ryan
*Assistant Examiner*—Colleen Cooke
*Attorney, Agent, or Firm*—Ratner & Prestia

[57] ABSTRACT

A hydrogen storage material comprising hydride-forming metallic particles and an interface activation composition, wherein the surface of at least some of the hydride-forming metallic particles have a discontinuous or partial deposit of said interface activation composition, such as one or more platinum group metals, is disclosed. The hydrogen storage material demonstrates improved kinetic and oxidation parameters over untreated particles.

20 Claims, 1 Drawing Sheet

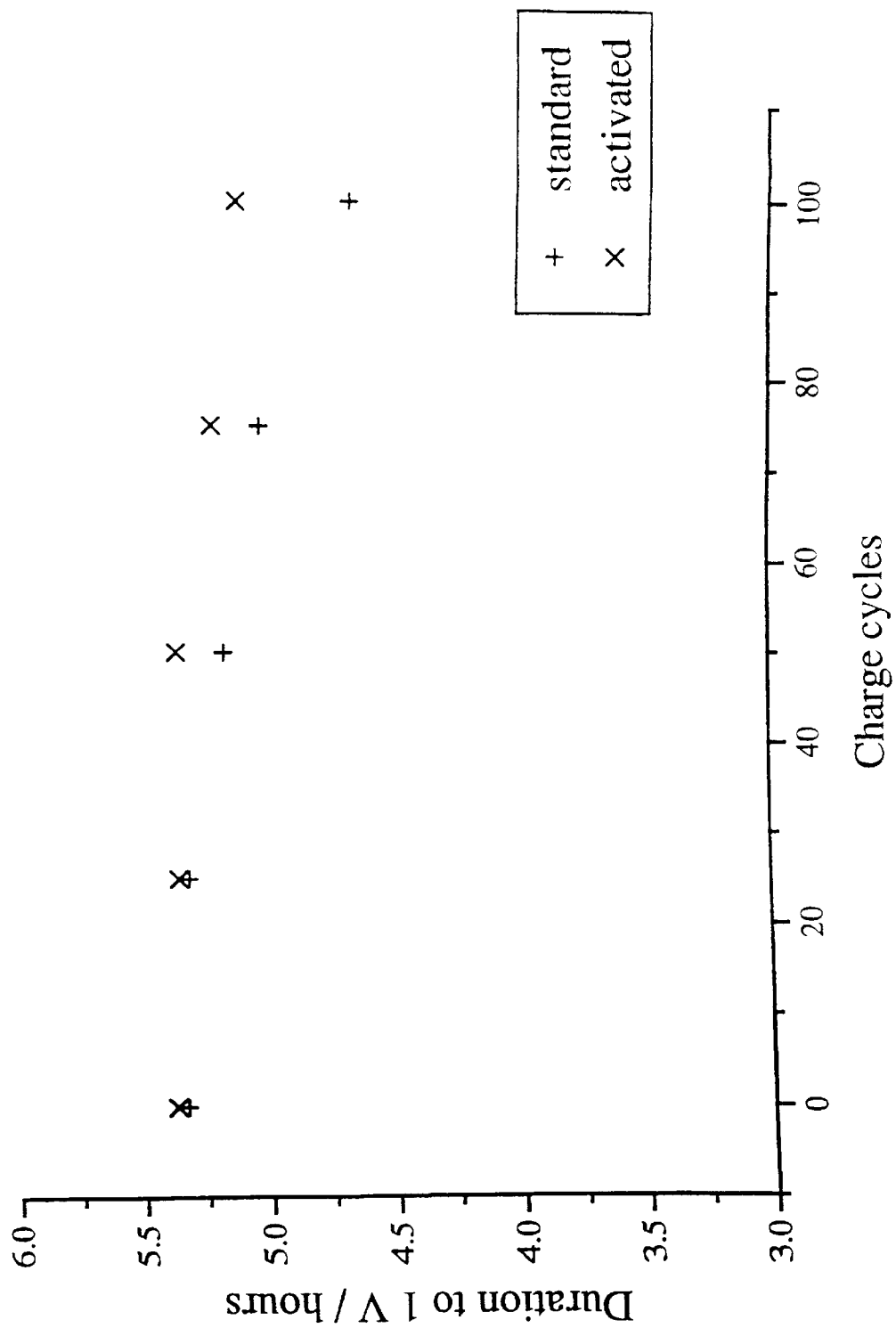

HYDROGEN STORAGE MATERIALS

This application is the U.S. national-phase application of PCT International Application No. PCT/GB98/01272.

The present invention relates to a novel hydrogen storage material; a process for preparing the same; and its use in improving hydrogen transfer during charge and discharge conditions such as those required for battery electrode application.

Rechargeable batteries of secondary cells have been available for many years and include lead-acid accumulators, car batteries and, more recently Ni—Cd cells. Efforts to improve the performance of lead-acid batteries have been effective in many respects, but the basic cell still uses lead with its environmental penalty and high density. Similarly, although Ni—Cd cells have a long lifetime, they use cadmium, which is potentially toxic and therefore also raises many environmental concerns. The demand for rechargeable batteries is ever increasing with the proliferation of portable electrical equipment such as mobile telephones, laptop computers, video cameras, power tools, garden equipment etc, also aircraft batteries, and with the prospective development of electric road vehicles.

There are many potential cell systems which have been evaluated for use in rechargeable batteries and one of the more popular ones use hydrogen storage material as an electrode. These are based on the ability of some metals or metal alloys to store hydrogen (in molecular, atomic or ionic form) within the metal lattice. The most commonly-used hydrogen storage material is a metal hydride. Typically, the metal hydride hydrogen storage electrode is the negative electrode in such a system, wherein the metal (M) is charged by the electrochemical absorption of hydrogen and the electrochemical evolution of a hydroxide ion:

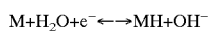

$$M + H_2O + e^- \leftrightarrow MH + OH^-$$

Metal hydride batteries depend on a reversible reaction as follows:

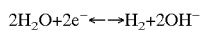

$$2H_2O + 2e^- \leftrightarrow H_2 + 2OH^-$$

Since the hydrogen storage material functions both as an electrode and as a store, it must be capable of efficiently carrying out several different functions: ie reversibly storing large quantities of hydrogen; rapidly transferring hydrogen across the surface interface during both charge and discharge conditions; and maintaining the rate of hydrogen pick-up and supply to maintain the voltage, this being dependent upon the diffusion of hydrogen through the hydrogen storage material and the rate of surface transfer. It must also be capable of charge transfer rates to match current voltage requirements of the battery; being rechargeable over many cycles without loss of performance, which requires chemical stability, even in overcharge conditions; being physically durable; being cost-effective and being non-toxic.

Amongst the main factors affecting the life and performance of a hydrogen storage material electrode, degradation of the hydrogen storage material leading to loss of its ability either to transport hydrogen and/or charge is important. This loss of ability has been linked to chemical instability where the metallic material becomes contaminated or oxidised. Oxidation can occur by the action of $OH^-$ groups, or by the generation of $O_2$ during charging or overcharging. The oxide formed on the surface of the hydrogen storage material offers a barrier to both hydrogen and charge transfer, thus degrading performance.

Considerable research has been carried out to attempt to overcome the problems of degradation of these hydrogen materials. At present there appears to be two approaches: the first involves mixing the hydrogen storage material, eg a powdered plated with nickel with another metal such as copper, nickel, cobalt, gold or carbon powder plated with platinum (Züttel et al, Journal of Alloys and Compounds, 206 (1994) 31–38), and compressing the powders to form a pellet. The second approach involves coating the hydrogen storage material particles with one or more complete coatings of metal. For example, Chen et al (J. Mater. Res., 9(7)(1994) 1802–1804) describe coating fine powders of $LaNi_{3.8}Co_{0.5}Mn_{0.4}Al_{0.3}$ with nickel, which led to improved performance of the alloy electrode. Geng (Journal of Alloys and Compounds, 215 (1994) 151–153) described continuous-coating an alloy powder with Pd and Ni—Pd. It was demonstrated that Pd and Ni—Pd completely covering the alloy powder surface were effective in improving the discharge capacity and cycle lifetime. However, when the Pd-coated alloy powder was also plated with Ni, the Ni densely covered the alloy powder surface, which made the activation of the alloy electrode difficult. Yunshin et al (Journal of Alloys and Compounds, 190 (1993) L37–L38) describe micro-encapsulation of alloy powders with Cu, Cr, Co, Ni, Ni—Co, Ni—Sn and Ni—W. Scanning electron microscopy (SEM) showed good homogeneity of the completely encapsulated (completely covered or coated) metal layers.

Similar attempts to solve the degradation problems have been described in U.S. Pat. Nos. 5,451,474 and 5,128,219, both of which relate to coating the whole surface of the hydrogen storage material with a barrier layer of a metal. Similarly, European patent specification number 198,599 describes a layer of metal covering an amorphous alloy system.

In all these cases where the coating on the metal hydride-forming material is continuous, problems are experienced which affect the performance of the system. For example, in the Yunshin reference is described an accumulation of rare-earth metal occurring on some of the coated layers. The larger the concentration of rare-earth metal on the surface, the larger the decrease in the hydrogen absorption property of the alloy, which can be seen from the capacity decrease of the electrodes. In other cases, a continuous layer of barrier metal acts as a rate-determining step since, in use, hydrogen must first diffuse through the coating prior to effecting hydrogenation of the system.

It was thus a surprise to the present inventors when they found that an alloy powder when treated to provide the surface of at least some of the alloy particles with a discontinuous or partial deposit of one or more layers of at least one platinum group metal gave a hydrogen storage material with good air stability and resistance to overcharging damage, as well as recombination properties of any oxygen/hydrogen formed during charging. The capacity was essentially unaffected, and the kinetics of charge were at least as good after air exposure as is the base material when maintained in an oxygen-free environment.

Accordingly, the present invention provides a hydrogen storage material comprising hydride-forming metallic particles and an interface activation composition, wherein the surface of at least some of the hydride-forming metallic particles have a discontinuous or partial deposit of said interface activation composition.

Suitable interface activation compositions are those which are understood to lower the activation energy for the transfer of hydrogen across the interface between the hydrogen storage material and another place. Preferably, the interface activation composition comprises one or more platinum group metals.

The term "platinum group metal" (PGM) is well understood by a person skilled in the art and is defined in "The Condensed Chemical Dictionary", 7th Edition.Ed. Arthur and Elizabeth Rose, Reinhold Publishing Corporation, New York 1961, as meaning "A group of six metals, all members of group VIII of the period system. They include ruthenium, rhodium, palladium, osmium, iridium and platinum". The interface activation composition may include a transition metal having a reduction potential less than that of the hydride, which resists oxidation and which may act as a seed for the PGM, such as nickel or copper.

Preferably, the interface activation composition comprises palladium and/or ruthenium, more preferably ruthenium.

The term "discontinuous or partial deposit" should be interpreted as meaning that only part of the hydride-forming metallic particle surface is covered by the interface activation composition. The term "discontinuously coated" is to be understood as having an equivalent meaning in the context of this specification. There may be particles present which are not discontinuously coated, and which may either have no coating or may be continuously coated. However, it is preferred that in the range of from about 5% to about 100% of the hydride-forming metallic particles have a discontinuous coating of the interface activation composition, more preferably from about 50% to about 100%, especially from about 80% to about 100%.

The quantity of interface activation composition deposited onto the surface of the metallic particles may vary from trace amounts up to approximately 10% by weight of the total weight of the material (w/w). The term "trace amount" refers to concentrations less than 2000 ppm, preferably less than 1000 ppm, for example 100 ppm or less. Preferably, particularly in the case where the interface activation composition comprises one or more PGMs, from about 0.02% to about 8% w/w, more preferably from about 0.08% to about 2% w/w of the or each PGM is deposited. From an economic viewpoint, the lower ranges are preferred. However, by using the discontinuous deposits according to the present invention, it has been found that the rates of hydrogen absorption/desorption do not vary significantly with thickness of the deposit, unlike in the case of the prior art continuous coatings. Hence, similar results are obtained, whether 8% w/w or 0.16% w/w is used, for example.

The hydride-forming metallic particles may be those of any hydride-forming metal or metal alloy known in the art.

Preferably, the hydride-forming metal is a metal which forms purely metallic hydrides or those hydrides of an intermediate nature (ie those possessing a degree of metallic bonding eg Mg); particularly preferred are Ti, Mg and Pd.

Suitably, the metal alloy is an intermediate compound. Various types of these compounds will be known to a skilled person, but include Haucke type ($AB_5$), Laves Phase ($AB_2$), $CeNi_3$ type ($AB_3$), $Ce_2Ni_7$ type ($A_2B_7$), CsCl—CrB type (AB),$Th_6B_{23}$ type ($A_6B_{23}$), $MoSi_2$ type ($A_2B$) and $Ti_2Ni$ type ($A_2B$). A further description of these types of intermetallic compounds may be found in Libowitz, Electrochem, Soc. Proc., 92(5), pp 3–23, all of which are suitable for use in the present invention. Preferably, the intermetallic compounds are of the type $AB_5$, AB or $AB_2$. Examples of these types include $LaNi_5$, TiNi, TiMn and TiFe and $ZrV_2$, $Zr(V_{0.33}Ni_{0.67})_2$, together with versions doped to control the pressure-composition-temperature plateau pressure and corrosion properties.

Another aspect of the present invention provides a method for producing an improved hydrogen storage material by surface activation of the hydride-forming metal or metal alloy particles by applying a discontinuous coating or deposit of an interface activation composition to the hydride-forming metallic particles.

A further aspect of the invention therefore provides a process for preparing a hydrogen storage material comprising forming a discontinuous or partial deposit of one or more PGMs on hydride-forming metallic particles.

The formation or application of the discontinuous deposit may be carried out be methods analogous to those known in the art and will be illustrated below in terms of the preferred PGM discontinuous deposit of the present invention. In the case where more than one PGM is used, the discontinuous deposits can be formed sequentially or simultaneously. Preferably, the method is by reducing a solubilised form of the PGM(s) in the presence of the hydride-forming metallic particles. For example, a PGM salt such as a chloride, eg $PdCl_4^{2-}$ or hexaminoruthenium(III) chloride, may be dissolved in a suitable solvent therefor, contacted with the hydride-forming metallic particles and, optionally in the presence of a complexing agent such as EDTA, reduced. The reduction may be effected by a reducing agent such as hydrazine hydrate or lattice hydrogen or via an exchange reaction with a hydrogen-containing or -forming substrate. Some of these processes may be termed electroless of exchange plating in the art.

If two or more PGMs are to be deposited, it is preferable that each individual PGM deposit forms discretely; however, the PGMs may also be co-precipitated to form a single discontinuous deposit comprising two or more PGMs. In the case where the discontinuous deposit comprises palladium and ruthenium, it is preferred to perform the palladium-depositing process first and thereafter form the ruthenium deposit.

More preferably, especially when discontinuously depositing palladium, the coating process is controlled by the presence of hydrogen in the hydride-forming metallic particles, ie lattice hydrogen. Accordingly, the process of the present invention more preferably comprises the step of introducing hydrogen into the hydride-forming metallic particles prior to the depositing step. Hydrogen-introduction may be carried out by any suitable process known to those skilled in the art, such as by gas phase hydrogenation (deposition of a reductant containing hydrogen ($H_2$, gas phase)) or by electrochemical or chemical reduction, or by hydrogen decrepitation. The advantages of this hydrogenation step is that it obviates the need for addition of a reducing agent during the discontinuous depositing step and appears to result in a site-specific reaction, enabling the discrete particles of the discontinuous deposit (eg of PGM, eg of Pd) to be optimally sited.

For example, gas phase hydrogenation may be effected by exposing the hydride-forming metallic particles to $H_2$ whereby it is absorbed into the metal lattice, preferably at slightly elevated temperature and/or pressure. Alternatively, hydrogen-introduction may be effected by forming the metallic particles into a cathode and electrochemical means used, such as by using base electrolysis, to generate $H_2$ which is then absorbed at the cathode. A further alternative method is to mix the metallic particles with a suitable reducing agent such as sodium borohydride and allow the reducing agent to decompose on the particles' surface, whereby some hydrogen becomes incorporated.

A further alternative hydrogenation method is that of decrepitation, which is particularly preferred when it is also desirable to reduce the particle size of the hydride-forming metallic particles. However, such particle-size reduction may be carried out by any method known in the art, such as by mechanical means (eg crushing or pulverisation) as well as by hydrogen decrepitation (described further below). The particles are suitably treated to give an average particle size in the range of from about 5 $\mu$m to about 100 $\mu$m, preferably from about 15 $\mu$m to about 40 $\mu$m.

Preferably, however, the particles are subjected to one or more cycles of hydrogen decrepitation. This procedure typically comprises the following steps:

(i) conditioning the hydride-forming metallic particles to facilitate the absorption of hydrogen thereby;

(ii) desorption; and (iii) hydrogenation.

The desorption and hydrogenation steps may be carried out as many times as required. The greater the number of cycles, the smaller the resulting particles will be.

Preferably, the decrepitation process is carried out in a hydrogenation chamber and more preferably in the absence of oxygen.

The conditioning step may be undertaken by heating the particles up to 200° C. and/or under pressure of up to about 10 bar (1 MNm$^{-2}$).

The desorption step may be undertaken at a pressure below that of the equilibrium pressure for the particles, more preferably under vacuum, which acts as an indicator for the desorption process. Preferably, desorption is undertaken under elevated temperature, to about 150° C., to speed the process. The desorption step results in dehydrogenation of the particles, although some hydrogen usually remains in the lattice.

The hydrogenation step is preferably undertaken at room temperature but elevated pressure up to about 8 bar (0.8 MNm$^{-2}$. It is preferred that the decrepitation process ends with a hydrogenation step so that deposition of the interface activation composition (preferably a PGM) takes place on hydrogen-loaded particles. It is preferred that the final desorption/dehydrogenation step be carried out during deposition.

Accordingly, the present further provides a method of preparing a hydrogen storage material, which method comprises:

(a) introducing hydrogen into hydride-forming metallic particles (whereby lattice hydrogen is available for use as a reductant);

(b) contacting the hydrogen-loaded particles thereby produced with a solubilised form of an interface activation composition, preferably in the absence of any further reducing agent (such as hydrazine hydrate); and preferably, simultaneously, dehydrogenating, preferably under reduced pressure.

The hydrogen storage material of the present invention provides a source of hydrogen that does not require pressure vessels or cryogenic handling, and that has a volumetric density higher than that for liquid hydrogen. Such a source of hydrogen may be used in a variety of applications, such as those mentioned hereinbefore, for example re-chargeable batteries, fuel cells, combustion engines, electronics, isotope separation, heat purification, catalytic dehydrogenation and hydrogenation reactions, and as a buffer capacity in any hydrogen handling process. Because the hydrogen storage material of the present invention provides hydrogen or energy in a cyclic fashion, at least two units comprising the material would be required in applications requiring a continuous source of hydrogen, one charging while the other is discharging.

For example, to manufacture an electrode comprising a material according to the invention, a suitable method comprises: hydrogenating hydride-forming metallic particles, forming a discontinuous deposit on the particles of a PGM and thereafter forming the resulting hydrogen storage material of the invention into an electrode. A preferred alternative is to form the electrode from the untreated particles (ie particles not having a deposit) and thereafter hydrogenate and discontinuously deposit PGM on the particles at the surface of the electrode. To manufacture an electrode or battery comprising a hydrogen storage material according to the invention, a suitable method comprise plasma-spraying a powder feed of hydride-forming metallic particles onto a (for example, Ni) substrate and hydrogenating then forming a discontinuous deposit of a PGM on the particles.

To manufacture a gas storage cell comprising a hydrogen storage material according to the invention, a suitable method comprises mixing hydride-forming metallic particles with an inert metal (such as Ni) powder, forming pellets thereof, hydrogenating the pellets, thereafter forming a discontinuous deposition of PGM on the pellets, and packaging the pellets into a suitable gas storage container.

A further aspect of the present invention provides a hydrogen electrode in which the hydrogen is stored using the hydrogen storage material of the present invention. A yet further aspect of the present invention provides a battery comprising a hydrogen electrode of the present invention.

The present invention will now be illustrated by way of the following examples, which are not intended to be limiting thereof.

EXAMPLE 1

The method is illustrated with reference to LaNi$_5$ particles, requiring a discontinuous deposit of about 0.2$\mu$ thickness.

Palladium deposition was accomplished by the reduction of the dichloride in an ammoniacal solution with EDTA using hydrazine hydrate. For a 12 g batch, the following solution and method was followed:

Make up: 0.99 g PdCl$_2$+6.2 g EDTA+74 ml 35% ammonia made up to 248 ml of UHP water.

Method: Add the LaNi$_5$ and stir, adding 6 drops of hydrazine hydrate over 5 minutes to reduce the Pd to metallic form. Stir for another 24 hours, then filter (542) and wash. Wash with propanol and dry.

Ruthenium deposition was accomplished as follows for a 5.5 g Pd/LaNi$_5$ starting material.

Make up a solution of 1.72 g NaOH and 5.7 ml 35% aqueous ammonia plus 0.86 g [Ru(NH$_3$)$_6$Cl$_3$] made up to 150 ml. Add the hydride powder and heat whilst stirring to 60° C. Add 1.5 ml of hydrazine hydrate over a period of 1 hour dropwise. Continue stirring at 60° C. for 1.5 hours from start of hydrazine addition. Turn off the heat and stir overnight. Filter and wash, water, then propanol and dry.

EXAMPLE 2

Preparation of Alloy Particles having Discontinuous Pd/Ru Deposit

A sample of alloy composition La$_{30.5}$Nd$_{1.68}$Pr$_{1.65}$Co$_{0.1}$Mn$_4$Al$_{1.88}$Ni$_{51.54}$(Alloy A), was adsorbed/desorbed in hydrogen (referred to as hydrogen decrepitation) for 5 cycles (ending on desorption/dehydrogenation step) to give a fine powder with particle size ca 30 $\mu$m. The decrepitation powder was then discontinuously deposited, by a method analogous to that of Example 1, with Pd(4% w/w and 0.08% w/w, respectively)

then Ru (4% w/w and 0.08% w/w, respectively) to give PGM coatings of 8% w/w total and 0.16% w/w total, respectively. Microstructural analysis by scanning electron microscopy (SEM), analysis by electron probe microanalysis (EPMA), inductively-coupled plasma (ICP) and X-ray photon spectroscopy (XPS) and hydrogenation kinetics by thermogravimetric analysis were performed.

A comparison of the kinetics of the discontinuously deposited Alloy A with the as-cast Alloy A are shown in Table 1 below.

TABLE 1

|  | Comparison Alloy A (as cast) | Composition 1 Alloy A 8 wt % Pd/Ru (50/50) | | Composition 2 Alloy A 0.16 wt % Pd/Ru (50/50) | |
| --- | --- | --- | --- | --- | --- |
| No. of H atoms /mol alloy | 4.8 | 4.6 | | 4.8 | |
| $H_2$ absorption time (mins) | 9* | 6 | | 6 | |
| $H_2$ desorption time (mins) | 60–120 | 80–100 | | 80–100 | |
| Air exposure time (mins) | 10 | 150 | 450 | 150 | 450 |
| No. of H atoms /mol alloy after exposure | Alloy poisoned | 4.6 | 4.6 | 4.8 | 4.8 |
| $H_2$ absorption time after exposure (mins) | | 6 | 7 | 6 | 10 |
| $H_2$ desorption time after exposure (mins) | | 60–90 | 60–90 | 100–120 | 100–120 |

*Indicates the alloy required activation under temperature and pressure. The treated (discontinuously deposited) alloy required no activation treatment before hydrogenation occurred.

Cycle Life for Standard and Activated Ni—MH Batteries

FIG. 1 shows the performance of the standard (Composition Alloy as cast) hydride electrode material and Composition 2. Cells containing identical weight hydride electrodes were tested under a charge/discharge regime through to 100 cycles, monitoring cell performance as hours for voltage to fall to 1 volt at a discharge rate of 56 mA, this being the rate consistent with a discharge of 0.2 $C_5A$.

The discontinuously deposited material exhibits a relatively flat profile with little loss or performance. The standard material shows a greater loss of capacity and hence a reduced life.

Comparison of Charge Retention for Standard and Activated Ni—MH Batteries

Charge retention tests were carried out on standard and discontinuously deposited (Composition 2) hydride electrode batteries. Each cell was charged at 0.1$C_5$A for 16 hours and then left to stand for 28 days at 20° C.=2° C. The cells were then discharged at 0.2$C_5$A and the ampere hour output measured to an end voltage of 1 volt. The data shown in Table 2 indicate a significant difference between the standard and discontinuously deposited hydride electrode cells.

TABLE 2

| Cell | Mean initial duration (hours) at 0.2$C_5$ to 1.0 V | Mean duration after 28 days open circuit (hours) at 0.2$C_5$ to 1.0 V |
| --- | --- | --- |
| Standard | 3.68 | 1.11 (70% loss) |
| Composition 2 | 5.29 | 3.06 (42% loss) |

EXAMPLE 3

Preparation in Hydrogen-Loading Method

A hydrogen storage material of the invention was prepared by a method analogous to that of Example 2 (alloy, hydrogen decrepitation) except that the decrepitation was undertaken for 5 cycles ending on a hydrogenation step. The decrepitation powder was then discontinuously deposited with Pd then Ru by a method analogous to that of Example 1 except that no hydrazine hydrate (added reducing agent) was used. The particles were dehydrogenated during the deposition step by applying a vacuum atmosphere (approx. $1 \times 10^3$ Pas). In analogous tests to those detailed above, it was found that the hydrogen storage materials of this example produced superior results to those of examples 1 or 2, particularly in terms of their sorption characteristics after exposure to air.

What is claimed is:

1. A hydrogen storage material comprising hydride-forming metallic particles and one or more platinum group metal(s), wherein the surface of at least some of the hydride-forming metallic particles have a discontinuous or partial deposit of one or more platinum group metal(s), which deposit is targeted to specific sites on the hydride-forming metallic particles by the use of a reduction.

2. A hydrogen storage material according to claim 1, wherein the hydride-forming metallic particles have one or more surface activated sites comprising the reductant retained in the metal lattice of the hydride-forming metallic particles.

3. A hydrogen storage material according to claim 2, wherein the reductant retained in the metal lattice of the hydride-forming metallic particles is hydrogen.

4. A hydrogen storage material according to any one of claims 1 to 3, wherein the platinum group metal is palladium and/or ruthenium.

5. A hydrogen storage material according to any of claims 1, 2 or 3, wherein the platinum group metal is or includes ruthenium.

6. A hydrogen storage material according to any of claims 1, 2, or 3, wherein the one or more platinum group metal(s) comprises up to 10% w/w of the total weight of the material.

7. A hydrogen storage material according to claim 6, wherein the one or more platinum group metal(s) comprises in the range of from about 0.08% to about 2% w/w.

8. A hydrogen storage material according to claim 7, wherein the one or more platinum group metal(s) comprises in the range of from about 0.08% to about 2% w/w.

9. A process for preparing a hydrogen storage material according to any one of claims 1 to 3, comprising a reaction between the hydride-forming metallic particles and a solubilised form of the PGM(s), wherein the reaction is carried out under reducing conditions.

10. A process according to claim 9, wherein the reducing conditions comprise the presence of a reducing agent, such as hydrazine hydrate or lattice hydrogen, or effect an exchange reaction with a hydrogen-containing or -forming substrate.

11. A process according to claim 10, wherein the reducing conditions comprise the presence of lattice hydrogen.

12. A process according to claim 11, which comprises introducing hydrogen into the hydride-forming metallic particles.

13. A process according to claim 12, which comprises hydrogen decrepitation.

14. A process according to claim 13, comprising:

(i) conditioning the hydride-forming metallic particles to facilitate the absorption of hydrogen thereby;

(ii) desorption; and (iii) hydrogenation.

15. A process for preparing a hydrogen storage material according to claims 1 to 3, comprising:

(i) reducing the particle size of hydride-forming metal or metal alloy particles;

(ii) exposing the hydride-forming metal or metal alloy particles to a hydrogen atmosphere such that traces of hydrogen remain within the particles;

(iii) forming a discontinuous coating or deposit of an interface activation composition, by reacting the resulting particles with a solubilised form of one or more platinum group metal(s), on the hydride-forming metal or metal alloy particles.

16. A process according to claim 8, wherein the size of the particles is reduced to give an average particle size of 5 μm–100 μm.

17. A process according to claim 8, which comprises:

(a) introducing hydrogen into hydride-forming metallic particles;

(b) contacting the hydrogen-loaded particles thereby produced with a solubilised form of a platinum group metal; and (c) dehydrogenating.

18. A process according to claim 8, which comprises:

(a) introducing hydrogen into hydride-forming metallic particles;

(b) contacting the hydrogen-loaded particles thereby produced with a soluble salt of a platinum group metal, such as $PdCl_2$ and/or $Ru(NH_3)_6Cl_3$, in the absence of any further reducing agent; and, simultaneously, (c) dehydrogenating under reduced pressure.

19. A hydrogen electrode in which hydrogen is stored using a hydrogen storage material according to any one of claims 1 to 3.

20. A rechargeable battery comprising a hydrogen electrode according to claim 19.

* * * * *

UNITED STATES PATENT AND TRADEMARK OFFICE
CERTIFICATE OF CORRECTION

PATENT NO. : 6,165,643
DATED : December 26, 2000
INVENTOR(S) : Mark L. Doyle et al.

It is certified that error appears in the above-identified patent and that said Letters Patent is hereby corrected as shown below:

Column 1,
Line 26, change "use" to -- uses -- and "material" to -- materials --.

Column 2,
Between lines 2 and 3, insert the word, "storage"; and
Line 3, change "appears" to -- appear --.

Column 3,
Line 54, change the word "intermediate" to -- intermettalic --.

Column 4,
Line 12, after "carried out", change "be" to -- by --;
Line 43, change "depositing" to -- deposition --; and
Line 48, change "advantages" to -- advantage --.

Column 5,
Line 41, after "present" insert -- invention --.

Column 6,
Line 12, change "comprise" to -- comprises --;.
Between line 31 and before line 33, insert the subheading -- Preparation of LaNi$_5$ Particles having PdRu Discontinuous Deposit -- ; and
Line 61, rewrite the composition "La$_{30.5}$Nd$_{1.68}$Pr$_{1.65}$Co$_{0.1}$Mn$_4$Al$_{1.88}$Ni$_{51.54}$" to
-- La$_{30.5}$Nd$_{1.68}$Pr$_{1.65}$Co$_{9.1}$Mn$_4$Al$_{1.88}$Ni$_{51.54}$ --.

Column 7,
Line 38, after "Alloy" insert -- A --; and
Line 46, after "loss", change "or" to --of --.

UNITED STATES PATENT AND TRADEMARK OFFICE
CERTIFICATE OF CORRECTION

PATENT NO. : 6,165,643
DATED : December 26, 2000
INVENTOR(S) : Mark L. Doyle et al.

It is certified that error appears in the above-identified patent and that said Letters Patent is hereby corrected as shown below:

<u>Column 8,</u>
Line 24, change the last word, "reduction" to -- reductant --.
Line 44, after "in the range of from about" delete "0.08", and insert therefor -- 0.02 --; and after "to about" delete "2% w/w", and insert therefor -- 8% w/w --.

Signed and Sealed this

Seventh Day of August, 2001

*Nicholas P. Godici*

*Attest:*

*Attesting Officer*

NICHOLAS P. GODICI
*Acting Director of the United States Patent and Trademark Office*